United States Patent Office 3,336,133

Patented Aug. 15, 1967

3,336,133

PROCESS FOR THE PURIFICATION AND CONCENTRATION OF COBALT AND NICKEL

Makoto Funatsu, Yasuhiro Torimae, Sumio Arai, and Hisahiro Kita, Wakayama, Japan, assignors to Kao Soap Company, Ltd., Tokyo, Japan, a corporation of Japan No Drawing. Filed Oct. 26, 1966, Ser. No. 589,525
Claims priority, application Japan, June 1, 1962, 37/22,203, 37/22,204
12 Claims. (Cl. 75—119)

This application is a continuation-in-part of our copending application Ser. No. 284,821, filed June 3, 1963, now abandoned.

The present invention relates to a process for the purification and concentration of cobalt and/or nickel by a new solvent extraction method in which cobalt or nickel is extracted from an aqueous layer, such as, an acid leach solution of an ore containing cobalt or nickel, an industrial waste solution containing cobalt or nickel, or a solution containing a small amount of cobalt or nickel by using an organic hydrogen thiophosphate as a cation-exchange liquid, and the extract liquid is treated with an aqueous solution of a suitable acid. The process can be also applied to the above-mentioned solution containing both cobalt and nickel to separate them individually, which are at the same time purified and concentrated.

As processes for purifying and concentrating cobalt or nickel in a high purity from the above-described solution containing the metal, there have been known a process of using an ion-exchange resin and a process of using an ion-exchange liquid, such as, dialkyl phosphoric acid or a high-molecular-weight amine. But, as there are many drawbacks in practice, e.g., operational problems or economical problems, these processes have not been used industrially. As is well known, there has been adopted industrially a wet purification process consisting of the purification of a solution, precipitation and washing, and in order to increase the purity of a desired element, these processes must be repeated.

In accordance with the process of this invention, cobalt or nickel including cobalt or nickel in a form of, e.g., the sulfate can be extremely easily and economically purified and concentrated, or separated and concentrated from the solutions of the types as mentioned above, which may be a mixture of cobalt or nickel and other similar metals, by a solvent extraction process in which water-insoluble organic hydrogen thiophosphates are used as a cation-exchange liquid. The organic hydrogenthiophosphates used in the process of this invention can be shown by the following general formulas:

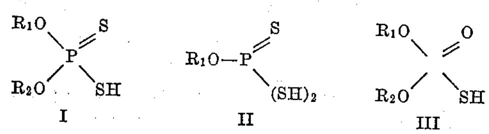

wherein $R_1$ and $R_2$ are radicals selected from the group consisting of saturated and unsaturated straight-chain and branched-chain aliphatic radicals having carbon chains of 8 to 22 carbon atoms inclusive, alkylbenzyl radicals and alkylphenyl radicals, each having 4 to 18 carbon atoms inclusive in the alkyl groups, the benzyl radical and the abietyl radical. Preferred examples of $R_1$ and $R_2$ are lauryl, stearyl, oleyl, 2-ethylhexyl, isodecyl, tridecyl, hexadecyl, nonylphenyl, octylphenyl, dodecylphenyl, benzyl, octylbenzyl, nonylbenzyl and abietyl.

That is, they are organic hydrogen thiophosphates named (I) O,O′-di(R)phosphorodithioic acid, (II) mono (R)phosphorotrithioic acid, and (III) O,O′-di(R)phosphorothioic acid. If the alkyl radical has carbon atoms less than 8, the resolution loss in water increases and if larger than 22, the viscosity increases and the phase-separating effect is reduced, by which the thiophosphates having such alkyl radicals cannot be used practically in this invention. Also, in the case of alkylphenyl and alkylbenzyl radicals, if the number of carbon atoms of the alkyl radical is above 18, the viscosity is high and the phase-separating effect is low, by which the corresponding thiophosphates also cannot be used practically in this invention.

In practicing the process of this invention, the above-shown organic hydrogen thiophosphates may be used alone as a nonaqueous extracting solvent but it is convenient, in general, to dilute them to a suitable concentration with an inert water-immiscible diluent, such as, benzene, toluene, kerosene, naphtha, xylene, carbon tetrachloride or chloroform. Further, higher alcohols may be added to them in order to increase the phase-separating effect as may be found necessary.

According to this invention, by using a nonaqueous solvent the above-mentioned thiophosphate alone or a solution of it in the above-mentioned diluent, the thiophosphate is brought into solution contact with an aqueous solution containing cobalt or nickel in accordance with conventional liquid-liquid solvent extraction procedures while adjusting suitably the concentration of the thiophosphate, whereby the cobalt or nickel in the aqueous phase is effectively extracted into the nonaqueous solvent layer. The solvent layer containing cobalt or nickel is, then treated with an aqueous solution of an acid having a suitable concentration to back extract the cobalt or nickel into the aqueous phase effectively. That is, by such an operation, cobalt or nickel can be purified and concentrated.

In practicing the present invention, it is preferable to first prepare a solution of a suitable water-immiscible organic hydrogen thiophosphate in a water-immiscible inert diluent to be used as the nonaqueous extracting solvent. The term "water-immiscible inert diluent" as used in the specification is understood to mean a suitable organic diluent having appreciable solubility for the specific organic hydrogen thiophosphate selected for use in accordance with this invention, and which is substantially immiscible or insoluble in water and is chemically inactive under the conditions of this invention.

Suitable examples of such inert water-immiscible diluents are hydrocarbons, such as, benzene, toluene, cyclohexane, hexane and octane; paraffinic or aromatic petroleum distillates, such as, light naphthas, heavy naphthas, kerosene and the like, xylene, chlorinated solvents, such as, carbon tetrachloride, chloroform perchloroethylene and the like; and lower water-immiscible ketones; esters, and the like. Inert water-immiscible light petroleum distillates such as kerosene or naphtha are preferred from economical view points.

The concentration of the organic hydrogen thiophosphate in the above-mentioned diluent may vary over a considerable range. For example, the water-immiscible selective extracting solvent may comprise a solution containing 1 to 50% by volume of the suitable organic hydrogen thiophosphate, the remainder being one or more of the above-mentioned inert diluents.

However, it should be noted that a stoichiometrical relation exists between the amount of cobalt or nickel which dissolves in the organic extracting solvent and the concentration of the thiophosphate to be used, and a sufficient amount of the organic hydrogen thiophosphate should be used depending on the concentration of cobalt or nickel in a leach solution.

In the process of this invention, by adjusting suitably the pH of the aqueous solution in the extraction and in the back extraction, it is possible not only to purify and concentrate cobalt or nickel but also to separate the metal from other metals. In general, it is preferable to adjust the pH of the aqueous solution in the extraction to 2.5 to 5 in the case of extracting cobalt and to 1.0 to 5 in the case of nickel. In a coexisting system of cobalt and nickel, it is possible to separate them from each other by extracting nickel at a pH of 1.0 to 2.5 and then extracting cobalt at a pH higher than 2.5 followed by purification and concentration.

As the concentration of the acid in the back extraction, it is preferable to adjust the pH to about 0.5 or lower. As the acid, it is desirable to use inorganic acid, such as sulfuric acid, hydrochloric acid, phosphoric acid, and nitric acid. Sulfuric acid and hydrochloric acid are preferred.

In the present invention, the loss of the organic hydrogen thiophosphates during the operation is very small. Further, the operation can be generally carried out at room temperature, and as there are no substantial changes in the results even if the temperature is increased. Any temperature can be adopted in practice if it does not make the operation difficult.

The examples of this invention are as follows:

EXAMPLE 1

The pH of an aqueous solution containing 2 g./l. of cobalt sulfate was adjusted to 2.5 to 5.0. A mixture of 100 parts of the aqueous solution and 100 parts of a kerosene solution containing 5% O,O′-di-2-ethylhexyl phosphorodithioic acid was stirred vigorously for about 1 minute at room temperature and allowed to stand, separating into two layers and extracting above 90% cobalt from the aqueous layer into the organic solvent layer. Then, the nonaqueous solvent layer containing cobalt was stirred vigorously for about 1 minute at room temperature with the addition of 20 parts of an aqueous solution of sulfuric acid having a concentration of 1 mole/l. and allowed to stand, separating into two layers and back extracting more than 90% cobalt from the solvent layer into the aqueous layer. By such a one-step operation, cobalt sulfate was concentrated to about four times the original concentration.

In addition, when the concentration of sulfuric acid in the back extraction was increased above 1 mol/l., the yield for the back extraction was not substantially changed. While, when the concentration was reduced to about 1/10 mole/l., the back extraction yield was reduced to 85% and the yield was reduced further as the concentration was reduced further.

When the back extraction was carried out by using hydrochloric acid, phosphoric acid or nitric acid instead of sulfuric acid, the yields were above 95% at the pH 0.5 and above 90% if the pH of the aqueous solution was about 0.8.

Further, when the above extraction and the back extraction were carried out at 50° C. and 80° C., the results were almost the same.

EXAMPLE 2

Instead of O,O′-di-2-ethylhexyl phosphorodithioic acid in Example 1, O,O′-dilauryl phosphorodithioic acid, O,O′-dibenzyl phosphorodithioic acid, O,O′-dinonylphenyl phosphorodithioic acid, O,O′-diabietyl phosphorodithioic acid, O,O′-dinonylbenzyl phosphorodithioic acid, O,O′-dioleyl phosphorodithioic acid were used in separate experiments. The results were completely similar to those in Example 1.

EXAMPLE 3

Instead of kerosene in Example 1, benzene and xylene were used in separate experiments, and the results were similar to those in Example 1.

EXAMPLE 4

The results of this example in which O,O′-di-2-ethylhexyl phosphorodithioic acid was used instead of O,O′-di-2-ethylhexyl phosphorodithioic acid in Example 1 was completely similar to those in Example 1.

EXAMPLE 5

Instead of O,O′-di-2-ethylhexyl phosphorodithioic acid in Example 1, monostearyl phosphorotrithioic acid and monolauryl phosphorotrithioic acid were used in separate experiments and the results were completely similar to those in Example 1.

EXAMPLE 6

The pH of an aqueous solution 2 g./l. of nickel sulfate was adjusted to 1.5 to 5.0. One hundred parts of the aqueous solution was brought into contact with 100 parts of kerosene solution containing 5% O,O′-di-2-ethylhexyl phosphorodithioic acid with stirring vigorously for about 1 minute at room temperature, and the mixture was allowed to separate into layers to extract above 99% nickel into the solvent layer from the aqueous layer. The separated solvent extract layer containing the nickel was, then, stirred vigorously for about 1 minute at room temperature with the addition of 20 parts of an aqueous solution of sulfuric acid having a concentration of 3 mole/l., and the mixture was allowed to separate to back extract about 95% nickel into the aqueous layer from the organic solvent layer. By such a one-step operation, nickel sulfate was concentrated to about 5 times the original concentration.

When the concentration of sulfuric acid in the above back extraction was above 3 mole/l., the yield of the back extraction was scarcely changed. However, when the concentration of sulfuric acid was reduced to 2 mole/l. and to 1 mole/l., the back extraction yield was reduced to 90% and 70% respectively, and the yield was reduced further as the concentration was reduced further.

Further, when the back extraction was carried out by using hydrochloric acid, phosphoric acid, and nitric acid in separate experiments instead of sulfuric acid, the back extraction yields were above 95% if the pH of the aqueous solution of the acid was about 0.5.

Also, when the above extraction and the back extraction were carried out as 50° C. and 80° C., the results were almost same in both cases.

EXAMPLE 7

Instead of O,O′-di-2-ethylhexyl phosphorodithioic acid in Example 6, O,O′-dilauryl phosphorodithioic acid, O,O′-dibenzyl phosphorodithioic acid, O,O′-di-octylphenyl phosphorodithioic acid, O,O′-diabietyl phosphorodithioic acid, O,O′-dinonylbenzyl phosphorodithioic acid, O,O′-dioleyl phosphorodithioic acid, etc., were used in separate experiments and the results were completely similar to those in Example 6.

EXAMPLE 8

Instead of kerosene in Example 6, benzene and xylene were used in separate experiments and the results were completely the same as those in Example 6.

EXAMPLE 9

Instead of O,O′-di-2-ethylhexyl phosphorodithioic acid in Example 6, monostearyl phosphorotrithioic acid, monododecylphenyl phosphorotrithioic acid and monolauryl phosphorotrithioic acid were used in separate experiments and the results were completely similar to those in Example 6.

EXAMPLE 10

Instead of O,O′-di-2-ethylhexyl phosphorodithioic acid in Example 6, O,O′-di-2-ethylhexyl phosphorothioic acid was used and the result was completely similar to those in Example 6.

EXAMPLE 11

The pH of an aqueous solution containing 2 g./l. of nickel sulfate and 2 g./l. of ferric sulfate was adjusted to 1.5. By applying the extraction operation same as in Example 6 to the aqueous solution, above 99% nickel was extracted into the solvent nonaqueous extract layer as in Example 6, while the ferric ion was scarely extracted. Further, from the solvent layer was purified and concentrated only nickel sulfate by a back extraction. Thus, by the process, nickel sulfate could be separated effectively from ferric sulfate and the purification and the concentration of the nickel sulfate could be attained.

EXAMPLE 12

The pH of a sulfuric acid-leach solution of a concentrate containing the concentrations of 15 g./l. of cobalt, 5 g./l. of nickel, 1 g./l. of copper and 0.5 g./l. of iron was adjusted to 1.2 with an aqueous solution of caustic soda. One hundred parts of the leach solution was brought into contact with 50 parts of a kerosene solution containing 100 g./l. of O,O′-di-2-ethylhexyl phosphorodithioic acid with stirring vigorously for 1 minute at room temperature, and the mixture was separated into an aqueous layer and a nonaqueous organic solvent extract layer. The analytical results for the aqueous layer show 14 g./l. of cobalt, 0.1 g./l. of nickel, 0.001 g./l. of copper and 0.001 g./l. of iron, and substantially almost all nickel, copper and iron were removed from the aqueous layer. The process can be, then, applied as pretreatment for an electrolytic production of cobalt to separate easily cobalt from nickel and obtain cobalt of high purity. Then, 50 parts of the organic phase in the above extraction process was treated with 10 parts of an aqueous solution of sulfuric acid with 3 mole/l. concentration to give a back extracted solution containing 23 g./l. of nickel and 4.5 g./l. of cobalt.

The embodiments of the invention in which an exclusive property or privilege is claimed are defined as follows:

1. A process for the separation of a metal substance selected from the group consisting of nickel, cobalt, and mixtures thereof from an aqueous solution containing said metal substance which comprises contacting said aqueous solution at a pH between 1.0 and 5.0 with a liquid water-immiscible extracting agent comprising an organic hydrogen thiophosphate selected from the group consisting of:

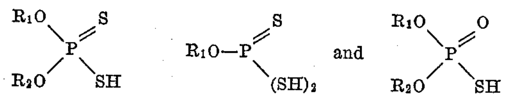

wherein $R_1$ and $R_2$ are radicals selected from the group consisting of straight-chain and branched-chain aliphatic radicals of 8 to 22 carbon atoms inclusive, alkylphenyl radicals and alkylbenzyl radicals, each having 4 to 18 carbon atoms inclusive in the alkyl groups, the benzyl radical and the abietyl radical, whereby said metal substance is extracted from said aqueous solution, separating said extract from said aqueous solution and recovering said metal substance from said extract.

2. A process according to claim 1, in which the water-immiscible extracting agent comprises the organic hydrogen thiophosphate dissolved in a water-immiscible inert diluent.

3. A process according to claim 2, in which said diluent is selected from the group consisting of kerosene, benzene, toluene, xylene, carbon tetrachloride and chloroform.

4. A process according to claim 1, in which the metal substance is recovered from the separated extract by extracting with an aqueous solution with an inorganic acid having a pH below 0.5.

5. A process according to claim 4, in which the inorganic acid is selected from the group consisting of sulfuric acid, hydrochloric acid, phosphoric acid and nitric acid.

6. The method of claim 1, in which the metal substance is cobalt and the aqueous solution is at a pH between 2.5 and 5.0.

7. The method of claim 1, in which the metal substance is nickel.

8. The method of claim 1, in which the metal substance is cobalt, the aqueous solution is at a pH between 2.5 and 5.0, and the water-immiscible extracting agent comprises the organic hydrogen thiophosphate dissolved in a water-immiscible inert diluent.

9. The method of claim 1, in which the metal is nickel and the water-immiscible agent comprises the organic hydrogen thiophosphate dissolved in a water-immiscible inert diluent.

10. A process for the separation and concentration of nickel and cobalt which comprises adjusting the pH of an aqueous solution containing both nickel and cobalt to 1.0–2.5, contacting said solution with a water-immiscible organic hydrogen thiophosphate selected from the group consisting of:

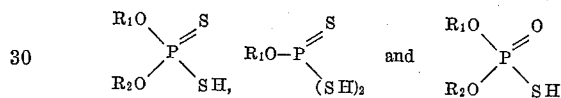

wherein $R_1$ and $R_2$ are radicals selected from the group consisting of straight-chain and branched-chain aliphatic radicals of 8 to 22 carbon atoms inclusive, alkylphenyl radicals and alkylbenzyl radicals, each having 4 to 18 carbon atoms inclusive in the alkyl groups, the benzyl radical and the abietyl radical, whereby nickel is extracted into a first extract, separating the extract and adjusting the pH of the remaining aqueous solution containing cobalt to 2.5–5.0, contacting said remaining solution with a second solvent comprising a water-immiscible organic hydrogen thiophosphate defined as above whereby cobalt is extracted into a second extract, and treating said first and second extracts, respectively, to recover the extracted nickel and cobalt, respectively, by treating with an aqueous solution of an inorganic acid selected from the group consisting of sulfuric acid, hydrochloric acid, phosphoric acid, and nitric acid, having a pH below 0.5.

11. The process as claimed in claim 10, wherein the water-immiscible organic hydrogen thiophosphate is used in solution in a water-immiscible inert diluent.

12. The process as claimed in claim 11, wherein the diluent is selected from a group consisting of kerosene, benzene, toluene, xylene, carbon tetrachloride and chloroform.

References Cited

UNITED STATES PATENTS 2,904,568 9/1959 Ertelt et al. ---------- 23—50

HYLAND BIZOT, *Primary Examiner.*

N. F. MARKVA, *Assistant Examiner.*